United States Patent [19]

Mager

[11] Patent Number: 5,220,408

[45] Date of Patent: Jun. 15, 1993

[54] METHOD AND APPARATUS FOR CALIBRATION OF OPTICAL FLYING-HEIGHT TESTERS

[75] Inventor: Michael Mager, San Jose, Calif.

[73] Assignee: Guzik Technical Enterprises, Inc., San Jose, Calif.

[21] Appl. No.: 805,545

[22] Filed: Dec. 10, 1991

[51] Int. Cl.⁵ .......................... G01B 11/00; G01J 1/02
[52] U.S. Cl. .................................... 356/372; 356/373; 356/343
[58] Field of Search ............... 356/372, 376, 373, 375, 356/379, 243, 128

[56] References Cited

U.S. PATENT DOCUMENTS

| | | | |
|---|---|---|---|
| 4,624,564 | 11/1986 | Dahlgren | 356/243 |
| 4,674,882 | 6/1987 | Dorman et al. | 356/373 |
| 4,681,451 | 7/1987 | Guerra et al. | 356/373 |
| 4,826,322 | 5/1989 | Philips | 356/373 |
| 4,988,194 | 1/1991 | Hara et al. | 356/243 |

Primary Examiner—Richard A. Rosenberger
Assistant Examiner—Hoa G. Pham
Attorney, Agent, or Firm—David Pressman

[57] ABSTRACT

An apparatus for calibration of optical flying-height testers includes a calibrated micropositioner (100), having a base surface (102) which is permanently attached to a flat horizontal platform (106) and a top surface (104). A transducing head (108) is rigidly, but removably, mounted onto the top surface of the micropositioner. A convex bottom surface (114) of a transparent lens (112), supported on screws (116, 118, and 120), is positioned directly above the transducing head. The lens is preloaded against the tips of the screws by springs (124, 126, and 128). A prism (132) is centrally positioned onto a flat top surface (130) of the lens. The prism contains working planes (136 and 138) which serve as light-energy entrance and exit surfaces and a planar bottom surface (142) which maintains optical contact with the flat top surface of the lens.

25 Claims, 3 Drawing Sheets

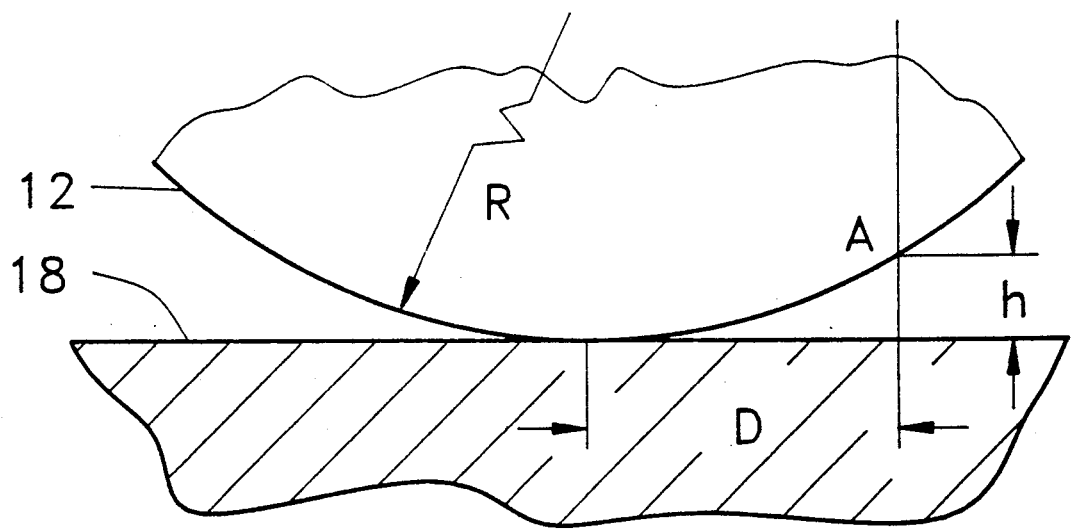
Fig. 1, PRIOR ART
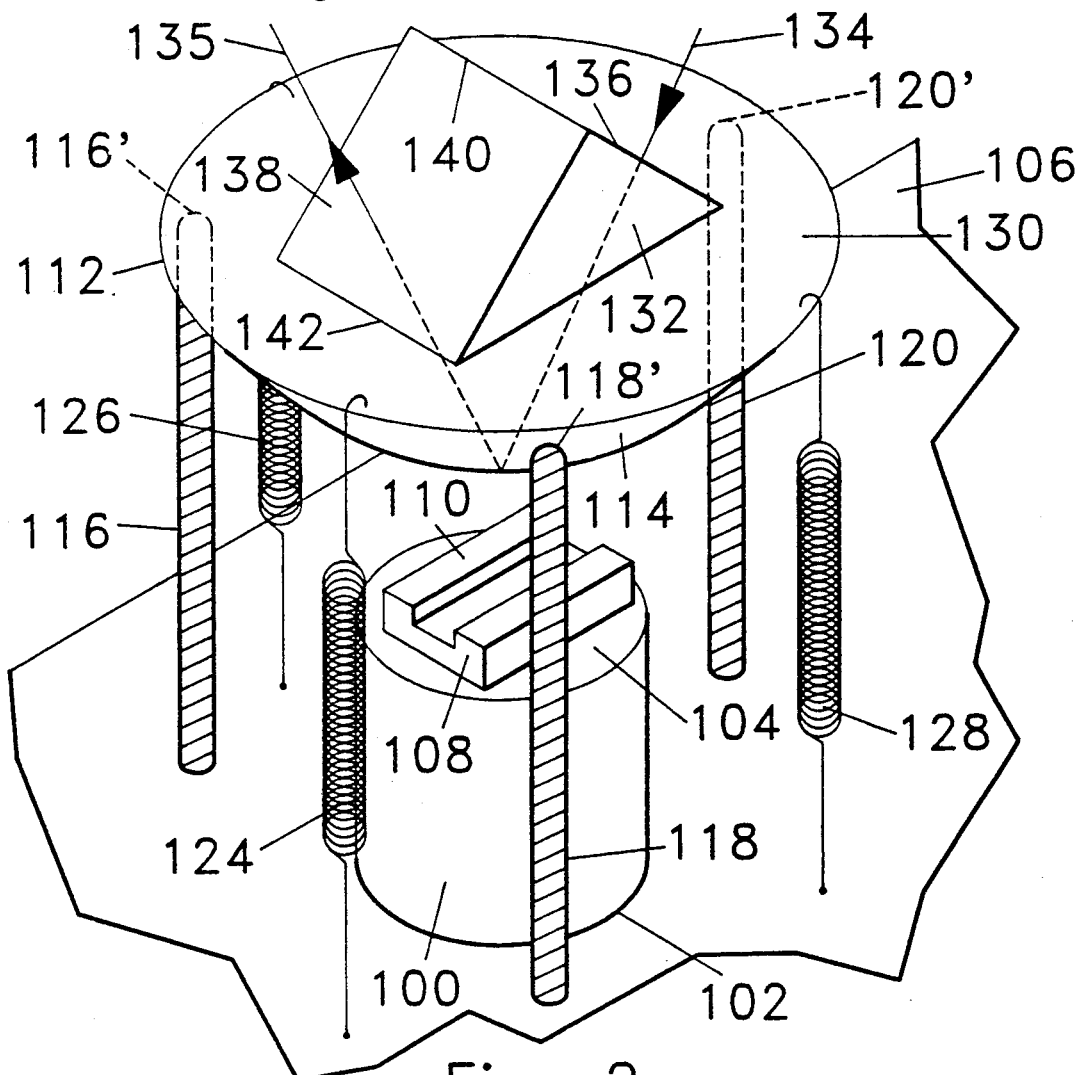
Fig. 2

METHOD AND APPARATUS FOR CALIBRATION OF OPTICAL FLYING-HEIGHT TESTERS

BACKGROUND

1. Field of Invention

The present invention relates to the field of linear measurement, specifically to optical methods of measuring microscopic distances between objects, e.g., between a magnetic read/write head and a magnetic storage disk, that participate in relative motion.

2. Description of Prior Art

During the operation of a computer disk drive, a read/write (transducing) head is supported on a thin cushion of air created by an adjacent magnetic disk, which is rotating at a high speed. The head must not "fly" too high or too low above the disk, but within a narrow elevation band in order to perform properly. Hence, it is necessary to be able to measure accurately the distance between a head and a disk for purposes of design and manufacturing. At the present time, flying-height testers, employing optical methods, are commonly utilized for this task. As with many other accurate measuring instruments, calibration of these devices is required.

The aforementioned flying-height testers measure the distance between facing, essentially parallel plane surfaces of a transducing head and a reference body representing a magnetic disk and composed of a homogeneous transparent dielectric. To measure this distance, electromagnetic radiation, such as visible light, is directed through the transparent object into the gap between the plane surfaces. The intensity of radiation reflected from the gap is related to the spacing between the surfaces and this spacing is determined from the measured intensity by means of a calibration table. However, optical parameters, such as refraction indices, of the objects bounding the gap are not known sufficiently well to allow the use of theoretically derived calibration tables. Therefore, a calibration procedure which determines a relationship between the intensity of reflected radiation and the true separation of the aforementioned surfaces is required.

In U.S. Pat. No. 4,624,564 to Robert Dahlgren, 1986, a "gap standard" for calibration of flying-height testers is proposed. The gap standard is a layered structure which is manufactured by depositing and etching layers of reflective and transparent materials on a substrate, using successive vacuum deposition and chemical etching operations. The standard simulates a gap of a precisely known height.

However, the manufacturing technology of the gap standard makes it impractical to produce the standard from the same materials as those of the objects used in the actual measurement. Substitutes for the original materials have to be employed, thus undermining the validity of calibration, especially when the optical properties of the original materials are not fully known. Moreover, since a single calibration standard simulates only one gap width, a large set of standards has to be manufactured and measured to obtain a calibration table. Furthermore, vacuum deposition and chemical etching technologies, used to manufacture the gap standard, render it relatively expensive.

Another calibration apparatus, disclosed in U.S. Pat. No. 4,681,451 to John Guerra et al., is shown in FIG. 1. A single-point contact is produced between two objects made of the same materials as those used in the actual measurement. The apparatus comprises two objects, one of which has a flat surface 18, while the other utilizes a convex surface 12 with a large radius of curvature. Surface 12 diverges predictably from surface 18 in the vicinity of the single-point contact. A width h of the gap between surfaces 12 and 18 at a point A is related through the predetermined geometry of surface 12 to a horizontal offset D. Offset D is the horizontal distance from the point of contact between surfaces 12 and 18 to a vertical line which goes through point A. Thereby, a range of known spacings is produced around the location of the aforementioned point of contact, and a calibration table can be obtained from the two-dimensional intensity pattern formed around this location.

However, this apparatus has several significant disadvantages. In reality, the single-point contact never occurs. Instead, the contacting objects deform under pressure in a way which is difficult to predict with sufficient accuracy, rendering the calibration relationship, which is based on the predetermined geometry of surface 12, invalid. Furthermore, liquid contaminants, such as water, accumulate inside the gap and are retained by a surface-tension force, thus making calibration below 25 nanometers (1 nm = $1 \times 10^{-9}$ meter) impossible.

OBJECTS AND ADVANTAGES

It is accordingly an object of the invention to provide an apparatus for calibration of optical flying-height testers, which overcomes the foregoing disadvantages, such as reliance on a predetermined surface geometry in order to perform the calibration. Other objects are to provide an apparatus which achieves high calibration accuracy by employing the same materials for calibration as those utilized in the actual flying-height test, which prevents liquid contaminants from influencing the accuracy of the measurements, and which is simple and inexpensive to manufacture. Further objects and advantages will become apparent after consideration of the ensuing description and the accompanying drawings.

DRAWING FIGURES

FIG. 1 is a schematic drawing of a prior-art calibration device.

FIG. 2 is a perspective view of a calibration apparatus of the invention, having a prism.

Figure 3:
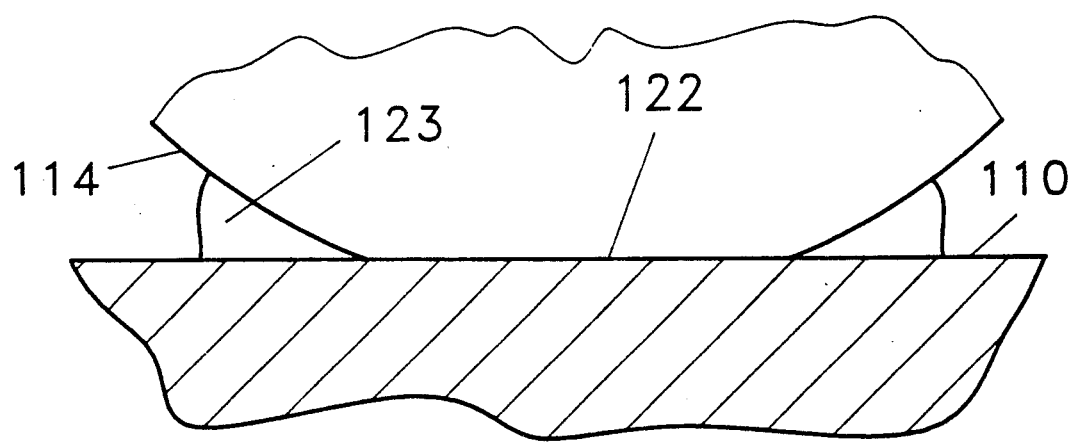
FIG. 3 is a schematic drawing showing a detail of the calibration apparatus depicted in FIG. 2.

For purposes of illustration, these figures are not necessarily drawn to scale.

REFERENCE CHARACTERS USED IN THE DRAWINGS AND DESCRIPTION h—gap width
A—point at which the gap is being measured
D—horizontal offset
12, 114—convex surfaces
18—flat surface
100—calibrated micropositioner
102—base surface
104—top surface
106—flat horizontal platform 108—transducing head
110—smooth air-bearing surface element
112—transparent lens
116, 118, 120—screws
116', 118', 120'—screw tips
122—optical contact area
123—liquid ring
124, 126, 128—stretched springs
132—prism
130—flat top surface
134, 134'—incident beams
135, 135'—reflected beams
136, 138—working surfaces
140—edge
142—planar bottom surface

FIGS. 2 THROUGH 4

Apparatus for Calibration of Optical Flying-Height Testers

Description

A perspective view of an apparatus for calibration of optical flying-height testers according to the present invention is shown in FIG. 2.

Figure 4:
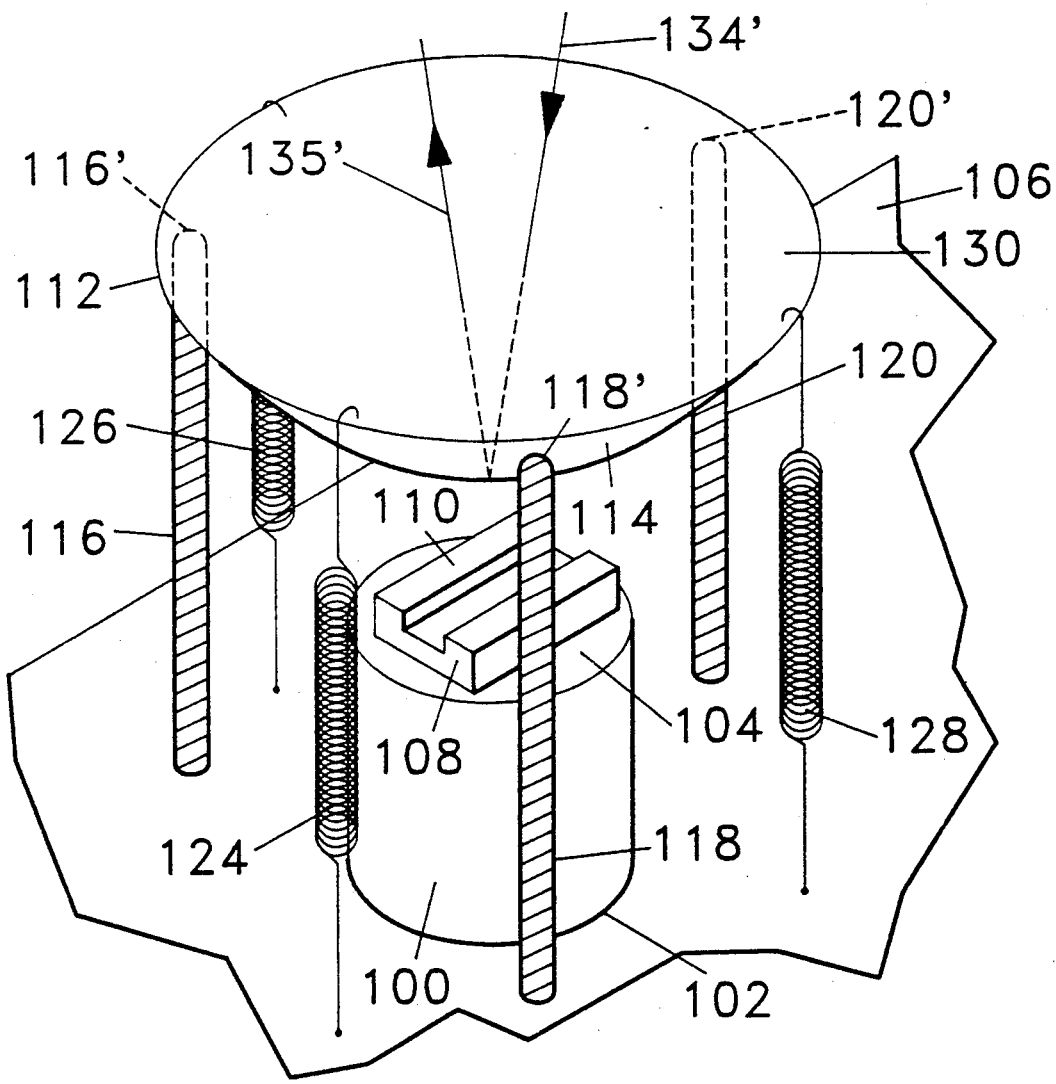
FIG. 4 is a perspective view of another embodiment of the calibration apparatus shown in FIG. 2.

The apparatus includes a calibrated micropositioner 100, such as model DPT-15 manufactured by Queensgate Instruments of Ascot, England, having a base surface 102 and a top surface 104. A micropositioner is a device which is able to impart accurate microscopic displacements to another object under the direction of an external control system. Surface 102 is permanently attached to a flat horizontal platform 106. A transducing head 108, having a smooth air-bearing surface element 110, is rigidly, but removably, affixed to surface 104, e.g., with a low-viscosity adhesive or a clamp (not shown). As depicted in FIGS. 2 and 4, surface element 110 is flat and thus has a radius of curvature which is infinite. During flying-height measurements, the separation between a test object, i.e., head 108, and a transparent body which simulates a magnetic disk, is measured.

A transparent lens 112, made of the same material as the transparent body normally used for flying-height measurements, is situated close to transducing head 108 and is positioned directly above the head. Lens 112 has a convex surface 114 which is supported by screws 116, 118, and 120 and rests on screw tips 116', 118', and 120'. Screws 116, 118, and 120 are mounted in platform 106 through threaded holes (not shown). Surface 114 contains a blind opening (not shown) and a groove (not shown), which secure lens 112 in a fixed position on screw tips 116', 118', and 120'. Lens 112 is preloaded against screw tips 116', 118', and 120' by stretched springs 124, 126, and 128, attached to a flat top surface 130 of lens 112 by means of a bracket (not shown). The opposite ends of springs 124, 126, and 128 are connected to platform 106. Surfaces 114 and 130 are polished to an optical quality of better than 10 nm rms (root mean square) surface roughness.

Contact can be established between surface 114 and surface element 110, as shown in FIG. 3. Upon contact, compression forces between these two surfaces produce plastic deformation resulting in an optical contact area 122. Moreover, a liquid ring 123, which is discussed in detail below, may appear around area 122.

A prism 132 (FIG. 2), made of the same material as lens 112, is centrally positioned onto surface 130 so that it resides directly over head 108. Prism 132 contains planar working surfaces 136 and 138 which share a common edge 140 and constitute an angle of essentially 90° to accommodate an incident beam 134 and a reflected beam 135. Beams 134 and 135 are nearly normal to surfaces 136 and 138, respectively. A planar bottom surface 142 of prism 132 maintains optical contact with surface 130. Optical contact between surfaces 130 and 142 may be enhanced by a thin layer of optical glue or immersion oil (not shown). Surfaces 136, 138, and 142 are also polished to an optical quality of better than 10 nm rms surface roughness.

Lens 112 and prism 132 are made of the same material as the transparent reference body utilized in the flying-height tester being calibrated. E.g., glass, plastic, a crystalline material or any other material which behaves as a homogeneous transparent dielectric with respect to optical radiation used in the apparatus may be utilized.

In one specific embodiment of the calibration apparatus, shown in FIG. 2, lens 112 has an outside diameter of approximately 5 cm, a thickness of about 5 mm, and a radius of curvature of approximately 1 m. Micropositioner 100 is approximately 6 cm long with a translation range of about 15 microns.

Another variation of the apparatus for calibration of flying-height testers is shown in FIG. 4. In this embodiment, prism 132 is eliminated, allowing an incident beam 134' and a reflected beam 135' to pass directly in and out of lens 112, respectively. Beams 134' and 135' form an angle of approximately 90° with respect to surface 130.

In both embodiments the angles at which optical beams arrive at the gap between surface 114 and surface element 110 depend on the type of flying-height tester being calibrated. These angles duplicate the angles at which optical beams arrive at the gap formed by the surfaces whose separation is being measured by the flying-height tester during its normal operation.

FIGS. 2 THROUGH 5

Operation

In operation, the calibration apparatus of the invention is coupled with a flying-height tester (not shown) or a device having an optical system equivalent to that of the flying-height tester being calibrated. The calibration apparatus is positioned in such a way that the gap between surface element 110 and surface 114 can be measured by the tester. Contact between air-bearing surface element 110 and convex surface 114 is then established by simultaneously rotating screws 116, 118, and 120 so that surface 114 is lowered with respect to platform 106. In order to position contact area 122 at a desired location on the surface element 110, lens 112 may be tilted by rotating one of the aforementioned screws clockwise or counterclockwise. The resulting elevation difference between surface 114 and surface element 110 is respectively counterbalanced, either by simultaneously raising or lowering screws 116, 118, and 120, or by lowering or raising head 108 by means of micropositioner 100.

The physical conditions for optical radiation are uniform within contact area 122 (FIG. 3). The intensity of the signal reflected from surface 114, i.e., the intensity of beam 135 (FIG. 2) or of beam 135' (FIG. 4), will therefore remain constant as long as the measurement region of the flying-height tester is contained inside area 122. The measurement region is an area on surface 114 which is illuminated by the probing optical signal emitted by the flying-height tester, i.e., beam 134 (FIG. 2) or beam 134' (FIG. 4).

Figure 5:
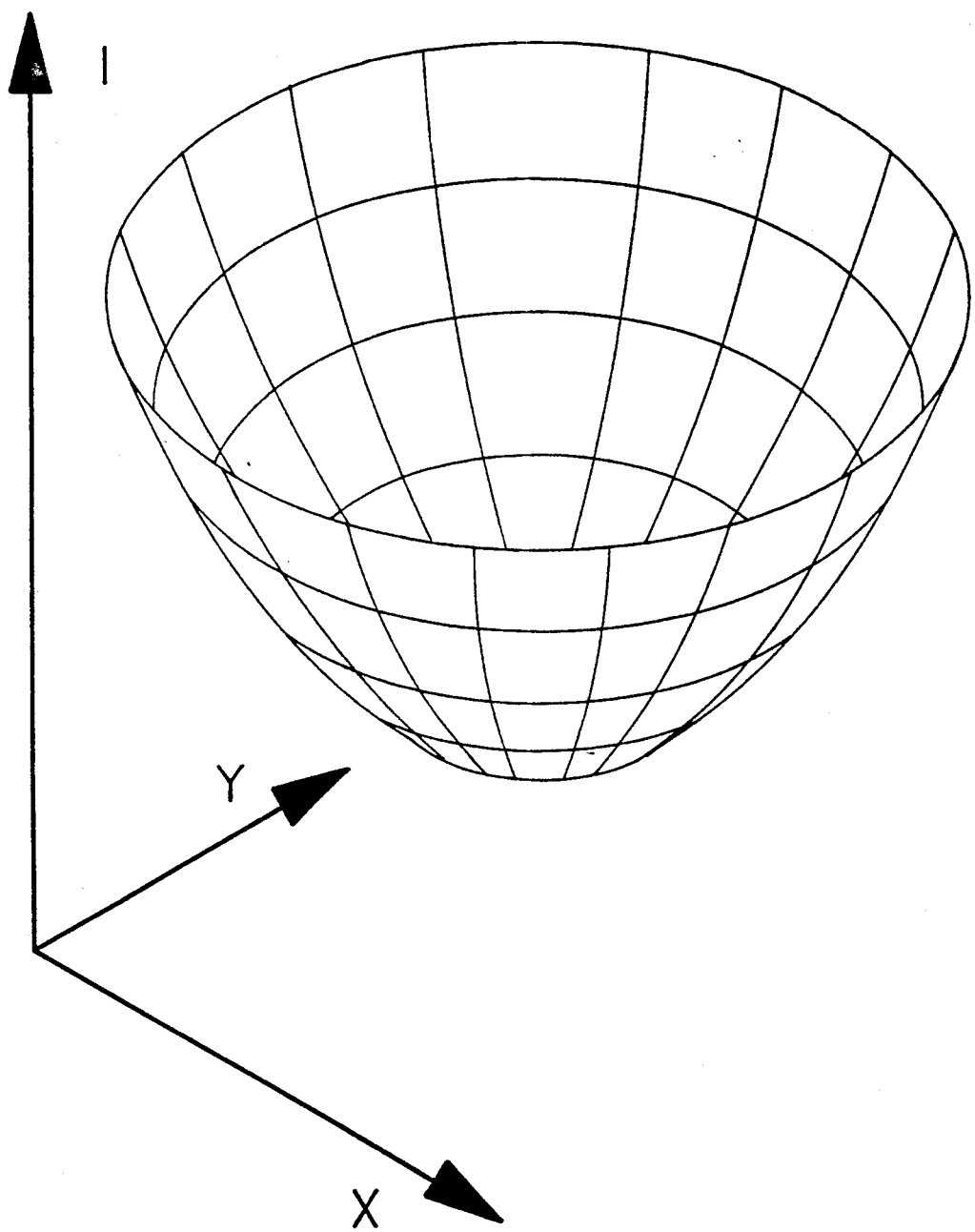
FIG. 5 is a three-dimensional plot of the intensity of a reflected signal as a function of the position of a flying-height tester's measurement region.

To properly position the measurement region, surface element 110 is placed a small distance (approximately 50 nm) away from surface 114. The probing signal emitted by the tester scans across surface 114 directly above surface element 110. This probing signal is directed by an external controller (not shown) of a known type. FIG. 5 is a typical three-dimensional plot of the intensity of the corresponding reflected signal as a function of the measurement region position. The desired location of the measurement region has the same X-Y positional coordinates as the minimum point (point corresponding to the least value of the intensity of the reflected signal) of the three-dimensional intensity plot. This minimum point is located by a method of orthogonal scanning iterations which is commonly utilized in the field of optics.

After the measurement region of the flying height tester is positioned, micropositioner 100 moves head 108 away from surface 114, so that the distance between surface element 110 and surface 114 exceeds the desired range of calibration. Micropositioner 100 then advances head 108 toward surface 114 one incremental distance at a time, while the flying-height tester attempts to measure the corresponding distances between surface element 110 and surface 114. As head 108 is brought closer to surface 114, the intensity of the reflected signal continuously changes. However, when contact is established between the surfaces of the lens and the head (FIG. 3), the resulting plastic deformation causes area 122 to encompass the measurement region and intensity changes are no longer observed. This event is used to identify the condition of initial contact between surface 114 and surface element 110.

The condition of initial contact between surface 114 and surface element 110 determines the reference point for the set of calibration measurements obtained during the incremental movement of micropositioner 100. Once the reference point has been established, this set of calibration measurements can be transformed into a calibration table for the flying-height tester.

It was mentioned above that due to surface tension forces, liquid contaminants, such as water, tend to fill narrow gaps between surfaces (FIG. 3). Since liquid ring 123 is concentric with contact area 122, the symmetry of the three-dimensional plot which represents the intensity of the reflected signal as a function of measurement region position is retained. Therefore, the center of the contact area and, hence, the desired location of the measurement region can still be determined without error. However, it becomes difficult to accurately identify the condition of contact between surface element 110 and surface 114.

The time needed for liquid contaminants to accumulate in the gap between surface 114 and surface element 110 ranges from a fraction of a second to several seconds. To prevent liquids from accumulating between the contacting surfaces, micropositioner 100 advances head 108 toward surface 114 with an average speed of hundreds of nanometers per second, while calibration measurements are performed by the flying-height tester. Fast movement of the micropositioner also helps to reduce the influence of temperature fluctuations on the calibrator assembly, particularly, on screws 116, 118, and 120. Alternatively, if the tester is not fast enough to synchronize its measurements with incremental movements of head 108, micropositioner 100 may periodically retrieve head 108 away from surface 114 for a period of time sufficient for liquids to disperse.

SUMMARY, RAMIFICATIONS, AND SCOPE

Thus, it has been shown that I have furnished a greatly improved apparatus for calibration of optical flying-height testers. The apparatus provides a high calibration accuracy since it employs the same materials for calibration as those used in an actual flying-height test. Its high-speed operation capability enables the apparatus to prevent liquid contaminants from corrupting the accuracy of calibration. Moreover, the apparatus is simple and uses many standard components—features which render it inexpensive and easy to manufacture.

Although the apparatus for calibration of flying-height testers has been shown and described in the form of several specific embodiments, its parts, materials, and configurations are given only as examples, and many other modifications of the apparatus are possible. For instance, to reduce thermal effects, the supporting screws for the lens can be made of a material having a low coefficient of thermal expansion. Furthermore, these screws may be threaded into the openings provided within platform 106 or they may be secured therein by means of another suitable arrangement, such as nuts or clamps. The bottom surface of lens 112 may constitute any smooth surface which ensures that contact between the bottom surface of the lens and the working surface of the transducing head occurs only in one place. Lens 112 may also be manufactured integrally with prism 132. In turn, the prism may be replaced by a transparent object having a different shape. Calibration inaccuracies, resulting from condensation of liquid contaminants between contacting surfaces, can be further minimized by directing a flow of dry nitrogen, or another gas, at the aforementioned surfaces. Moreover, different optical devices for measuring microscopic distances may be calibrated since the transducing head, attached to the micropositioner, can be substituted with any other comparable object. Therefore, the scope of the invention should be determined, not by the examples given, but by the appended claims and their legal equivalents.

What I claim is:

1. A method for calibrating an optical device for measuring microscopic distances, said optical device having a measurement region and a calibration range, said method comprising the steps of:

placing a working surface of a test object a microscopic distance underneath a contact surface of a transparent object, said working surface having a radius of curvature, said contact surface having a radius of curvature;

positioning said measurement region on said contact surface of said transparent object;

moving said test object away from said transparent object to a location beyond said calibration range;

producing a set of calibration measurements by advancing said test object towards said transparent object in a series of known incremental displacements while said optical device measures distances between said contact surface of said transparent object and said working surface of said test object by directing an incident light beam through said transparent object onto said contact surface and recording an intensity level of a corresponding reflected beam;

minimizing effects of liquid condensation on the accuracy of calibration during said step of producing a set of calibration measurements by advancing said test object towards said transparent object with a speed fast enough to avoid said liquid condensation;

detecting a physical contact between said contact surface of said transparent object and said working surface of said test object; and generating a calibration curve for said optical device from said set of calibration measurements, said calibration curve having a reference point, said physical contact determining said reference point.

2. The method recited in claim 1 wherein said working surface of said test object and said contact surface of said transparent object are smooth.

3. The method recited in claim 2 wherein said radius of curvature of said working surface of said test object differs from said radius of curvature of said contact surface of said transparent object so that contact between said surfaces occurs only at one place.

4. The method recited in claim 1 wherein said incident light beam is directed to illuminate a spot on said contact surface of said transparent object, whereby said spot is in said measurement region.

5. The method recited in claim 4 wherein said measurement region is positioned to correspond to a position coordinate of a minimum point of a three-dimensional plot representing intensity of said reflected beam as a function of the position of said measurement region.

6. The method recited in claim 5 wherein said position coordinate of said minimum point of said three-dimensional plot is obtained through successive orthogonal scanning iterations.

7. The method recited in claim 1 wherein said step of minimizing effects of liquid condensation further includes periodically moving said test object a known distance away from said transparent object until said liquid condensation disperses and bringing said test object said known distance towards said transparent object to resume said calibration measurements.

8. The method recited in claim 1 wherein said step of detecting said physical contact is performed by monitoring said intensity level of said reflected beam, whereby said physical contact occurs and is detected when said intensity level becomes constant.

9. An apparatus for calibration of an optical device for measuring microscopic distances, said apparatus comprising:

a test object having a working surface with a radius of curvature;

a transparent body having a top surface and a bottom surface, said bottom surface having a radius of curvature, said working surface of said test object being positioned directly underneath said bottom surface, said working surface of said test object being situated a microscopic distance away from said bottom surface;

transparent means for directing incident light energy emitted by said optical device into said transparent body and directing reflected light energy out of said transparent body;

adjustable support means for supporting and positioning said transparent body;

flexible means for preloading said transparent body against said adjustable support means, said flexible means having top and bottom ends;

translatory means for imparting known displacements to said test object; and platform means for securing said translatory means, said adjustable support means, and said bottom ends of said flexible means.

10. The apparatus of claim 9 wherein said working surface of said test object and said bottom surface of said transparent body are smooth.

11. The apparatus of claim 10 wherein said radius of curvature of said working surface of said test object differs from said radius of curvature of said bottom surface of said transparent body so that contact between said working surface and said bottom surface occurs only at one place.

12. The apparatus of claim 9 wherein said test object is a transducing head of a computer disk drive.

13. The apparatus of claim 9 wherein said top surface of said transparent body is flat.

14. The apparatus of claim 13 wherein said top surface and said bottom surface of said transparent body have surface finishes of optical quality.

15. The apparatus of claim 9 wherein said transparent body and said transparent means are made of a material selected from the group consisting of glass, plastic, and crystalline materials.

16. The apparatus of claim 9 wherein said transparent means comprises a prism having a planar bottom face, a planar energy entrance surface, and a planar energy exit surface, said planar energy entrance and exit surfaces being angularly disposed with respect to each other, said planar bottom face being in optical contact with said top surface of said transparent body.

17. The apparatus of claim 16 wherein said energy entrance surface, said energy exit surface, and said planar bottom surface have surface finishes of optical quality.

18. The apparatus of claim 9 wherein said adjustable support means comprises at least three threaded studs.

19. The apparatus of claim 9 wherein said flexible means comprises a plurality of coil springs, said top ends being attached to said transparent body, said bottom ends being connected to said platform means.

20. The apparatus of claim 9 wherein said translatory means comprises a calibrated micropositioner having a base surface and a crown surface, said transducing head being rigidly and removably attached to said crown surface.

21. The apparatus of claim 9 wherein said platform means comprises a flat platform, said threaded studs being threaded into said flat platform, said base surface being rigidly attached to said flat platform.

22. An apparatus for calibration of an optical device for measuring microscopic distances, said apparatus comprising:

a transducing head of a computer disk drive having a smooth surface with a radius of curvature;

transparent means for conducting optical radiation emitted by said optical device, said transparent means having a flat top surface and a convex bottom surface, said convex bottom surface having a radius of curvature, said smooth surface of said transducing head being positioned directly underneath said convex bottom surface, said smooth surface of said transducing head being situated within a microscopic distance relative to said convex bottom surface, said flat top surface and said convex surface of said transparent means having surface finishes of optical quality;

a plurality of threaded studs, said transparent means being positioned onto the tips of said plurality of threaded studs;

a plurality of preloaded springs having top ends and bottom ends, said top ends being attached to said transparent means;

a calibrated micropositioner having a base surface and a crown surface, said transducing head being rigidly and removably attached to said crown surface; and a flat platform, said plurality of threaded studs being threaded into said flat platform, said base surface being rigidly attached to said flat platform, the bottom ends of said plurality of springs being secured to said flat platform.

23. The apparatus of claim 22 wherein said radius of curvature of said smooth surface of said transducing head differs from said radius of curvature of said convex bottom surface of said transparent means so that contact between said surfaces occurs only at one point.

24. The apparatus of claim 22 wherein said transparent means comprises an optically transmissive body made of a material selected from the group consisting of glass, plastic, and crystalline materials.

25. The apparatus of claim 22 wherein said plurality of threaded studs is at least three.

* * * * *